United States Patent
Bhatt et al.

(10) Patent No.: US 10,769,522 B2
(45) Date of Patent: Sep. 8, 2020

(54) METHOD AND SYSTEM FOR DETERMINING CLASSIFICATION OF TEXT

(71) Applicant: WIPRO LIMITED, Bangalore (IN)

(72) Inventors: Deepak Bhatt, Bangalore (IN); Prashant Singh, Bangalore (IN)

(73) Assignee: Wipro Limited, Bangalore (IN)

( * ) Notice: Subject to any disclaimer, the term of this patent is extended or adjusted under 35 U.S.C. 154(b) by 762 days.

(21) Appl. No.: 15/475,265

(22) Filed: Mar. 31, 2017

(65) Prior Publication Data

US 2018/0240012 A1    Aug. 23, 2018

(30) Foreign Application Priority Data

Feb. 17, 2017 (IN) .............................. 201741005770

(51) Int. Cl.
*G06N 3/08* (2006.01)
*G06N 3/04* (2006.01)
*G06F 16/35* (2019.01)

(52) U.S. Cl.
CPC .............. *G06N 3/08* (2013.01); *G06F 16/35* (2019.01); *G06N 3/0445* (2013.01)

(58) Field of Classification Search
CPC ... G06K 9/62–726; G06K 9/6288–2009/6295; G06K 9/00442;
(Continued)

(56) References Cited

U.S. PATENT DOCUMENTS 9,805,255 B2 * 10/2017 Yang .................... G06K 9/6288
9,836,671 B2 * 12/2017 Gao .................... G06F 16/3347
(Continued)

FOREIGN PATENT DOCUMENTS

CN          105740226       7/2016
EP          3 046 053       7/2016
WO     WO 2016/145850      9/2016

OTHER PUBLICATIONS

Wang, Di et al.; A Long Short-Term Memory Model for Answer Sentence Selection in Question Answering; 2015; Association for Computational Linguistics; Proceedings of the 53rd Annual Meeting of the Association for Computational Linguistics; pp. 707-712. (Year: 2015).*

(Continued)

*Primary Examiner* — Stanley K. Hill
(74) *Attorney, Agent, or Firm* — Finnegan, Henderson, Farabow, Garrett & Dunner, LLP

(57) ABSTRACT

Embodiments of the present disclosure discloses method and system for determining classification of text. The present disclosure discloses to receive text from plurality of texts and generating a pair of vector representation of the text using trained model parameters of a pair of LSTM units. The trained model parameters are obtained based on training of classification system using plurality of similar pair of texts and plurality of dissimilar pair of texts from the plurality of texts. Further, pair of vector representations are combined using a combiner operator to obtain a combined vector representation. The combiner operator is selected from a plurality of combiner operators based on the training using accuracy of classifier of classification system. The combined vector representation is provided to the classifier for determining classification of text. The present disclosure enhances the performance and generalisation of a classifier in cases of a multi-class classification.

13 Claims, 8 Drawing Sheets

(58) Field of Classification Search
CPC ... G06K 9/00456; G06K 9/6267–6287; G06K 9/6292–6293
See application file for complete search history.

(56) References Cited

U.S. PATENT DOCUMENTS

| | | |
|---|---|---|
| 10,268,671 B2* | 4/2019 | Kaiser .................... G10L 25/30 |
| 2015/0269668 A1* | 9/2015 | Gil ....................... G06Q 40/025 |
| | | 705/38 |
| 2016/0232440 A1 | 8/2016 | Gregor et al. |

OTHER PUBLICATIONS

Zhou, Peng et al.; Attention-Based Bidirectional Long Short-Term Memory Networks for Relation Classification; 2016; Association for Computational Linguistics; Proceedings of the 54th Annual Meeting of the Association for Computational Linguistics, pp. 207-212. (Year: 2016).*

Palangi, Hamid et al.; Deep Sentence Embedding Using Long Short-Term Memory Networks: Analysis and Application to Information Retrieval; pp. 1-25. (Year: 2016).*

Wang, Shouhang et al.; 2016; Learning Natural Language Inference with LSTM; 10 pages. (Year: 2016).*

Cheng, Jianpeng et al.; 2016; Long Short-Term Memory-Networks for Machine Reading; 2016; 11 pages. (Year: 2016).*

* cited by examiner

METHOD AND SYSTEM FOR DETERMINING CLASSIFICATION OF TEXT

TECHNICAL FIELD

The present subject matter is related in general to the field of determining classification, more particularly, but not exclusively to a method and system for converting text to a vector representation for determining classification of the text.

BACKGROUND

Machine learning models are configured to identify category (also referred as classification) to which a problem or an object belongs to. The classification may be based on a training set of data containing observations whose classification is known. Determining classification of text may include converting the text into its vector representation and then providing the vector representation to a classifier. The classifier understands the vector representation of texts and henceforth learn the categories associated to each of the texts. One or more existing neural networks and models are configured to convert the texts to its corresponding vector representation. Output of the neural networks are vectors with float values which correspond to the vector representations of the texts. One of the neural networks include Long Short Term Memory (LSTM) units which are used in field of text analytics. The LSTM units have an ability to map sequence of texts (also referred as words or sentences of variable lengths) into corresponding vector representation.

The machine learning models may be trained for identifying the categories associated with text. The training may include identifying the hyperplanes between n-dimensional vector representations of texts from two different categories in training dataset. Existing method derives n-dimensional representation in an unsupervised manner (such as well-known tf-idf approach). Such training methods ignores comparison of each text with each of the other text based on category associated with each of the texts. Also, one or more existing systems do not disclose to include difference between category of the texts for training. The one or more existing systems may not be providing a desired performance of the classifiers. Also, generalization of the classifier is not accurate with the one or more existing systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for determining classification of text. The method includes receiving a text from a plurality of texts and generating a first vector representation of the text using first trained model parameters of a first Long Short Term Memory (LSTM) unit and a second vector representation of the text using second trained model parameters of a second LSTM unit. The first and second trained model parameters are obtained based on training of the text classification system using a plurality of similar pair of text and a plurality of dissimilar pair of text from the plurality of texts. Further, the first vector representation and the second vector representation are combined using a combiner operator to obtain a combined vector representation. The combiner operator is selected from a plurality of combiner operators based on the training using accuracy of a classifier of the text classification system. The combined vector representation is provided to the classifier for determining a classification of the text.

In an embodiment, the present disclosure relates to a classifying system for determining classification of text. The text classification system comprises a processor and a memory which is communicatively coupled to the processor. The memory stores processor-executable instructions, which, on execution, cause the processor to receive a text from a plurality of texts and generate a first vector representation of the text using first trained model parameters of a first Long Short Term Memory (LSTM) unit and a second vector representation of the text using second trained model parameters of a second LSTM unit. The first and second trained model parameters are obtained based on training of the text classification system using a plurality of similar pair of text and a plurality of dissimilar pair of text from the plurality of texts. Further, the first vector representation and the second vector representation are combined using a combiner operator to obtain a combined vector representation. The combiner operator is selected from a plurality of combiner operators based on the training using accuracy of a classifier of the text classification system. The combined vector representation is provided to the classifier for determining a classification of the text.

A non-transitory computer readable medium including instructions stored thereon that when processed by at least one processor cause a device to perform operations comprising receiving a text from a plurality of texts and generating a first vector representation of the text using first trained model parameters of a first Long Short Term Memory (LSTM) unit and a second vector representation of the text using second trained model parameters of a second LSTM unit. The first and second trained model parameters are obtained based on training of the text classification system using a plurality of similar pair of text and a plurality of dissimilar pair of text from the plurality of texts. Further, the first vector representation and the second vector representation are combined using a combiner operator to obtain a combined vector representation. The combiner operator is selected from a plurality of combiner operators based on the training using accuracy of a classifier of the text classification system. The combined vector representation is provided to the classifier for determining a classification of the text.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
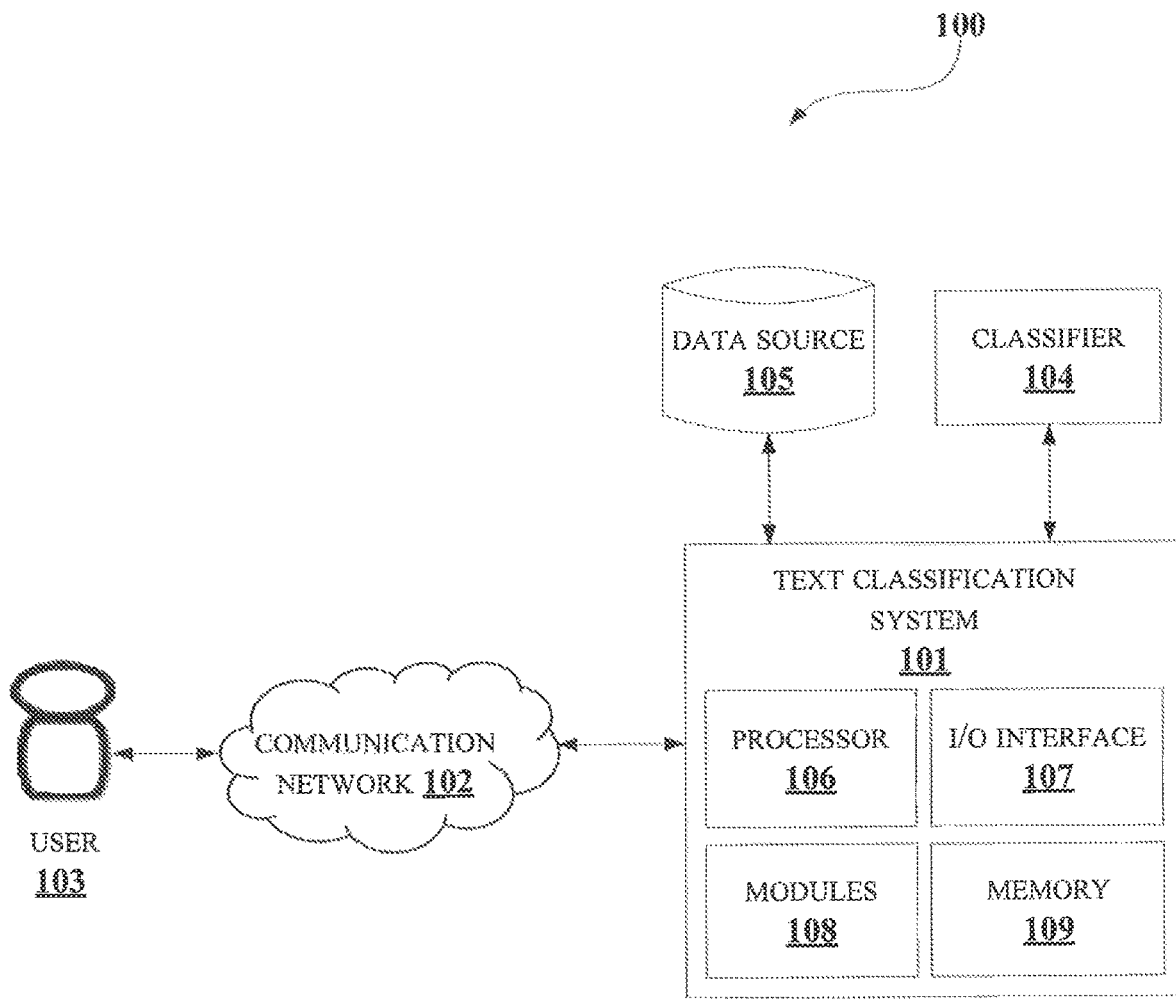
FIG. 1 illustrates an exemplary environment for determining classification of text in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a text classification system for determining classification of text. The method of the present disclosure aims in enhancing the performance and generalization of a classifier. The text classification system may be configured by training for determining the classification of the text. In real-time, text from plurality of texts for which the classification is to be determined is received. A first vector representation of the text is generated using first trained model parameters of a first Long Short Term Memory (LSTM) unit and a second vector representation of the text is generated using second trained model parameters of a second LSTM unit. The first and second trained model parameters are obtained based on training of the text classification system using plurality of similar pair of text and plurality of dissimilar pair of text from the plurality of texts. Further, the first vector representation and the second vector representation are combined using a combiner operator to obtain a combined vector representation. The combiner operator is selected from a plurality of combiner operators based on the training using accuracy of a classifier of the text classification system. The combined vector representation is provided to the classifier for determining the classification of the text.

FIG. 1 illustrates an exemplary environment 100 for determining classification of a text in accordance with some embodiments of the present disclosure.

As shown in FIG. 1, the environment 100 may include a text classification system 101, a communication network 102, a data source 105 and a classifier 104 associated with the text classification system 101, along with a user 103 who may be associated with the text classification system 101. Further, the text classification system 101 comprises a processor 106, I/O interface 107, one or more modules 108 and a memory 109. The memory 109 may be communicatively coupled to the processor 106 and stores processor-executable instructions, which, on execution, cause the processor 106 to determine the classification of the text. The text classification system 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

The text classification system 101 may be initially trained for determining the classification of the text. The training of the text classification system 101 configures the text classification system 101 to provide a combined vector representation of the text which may be provided to the classifier 104 for determining the classification. The training of the classification includes training using plurality of similar pair of texts and plurality of dissimilar pair of texts from the plurality of texts and training using each of the plurality of texts based on accuracy of the classification determined by the classifier 104. In an embodiment, the plurality of texts may be stored in the database 105 and the user 103 may retrieve the text from the database 105. The plurality of similar pair of texts and the plurality of dissimilar pair of texts may also be provided by the user 103 via Graphical User Interface (GUI) (not shown in figure) associated with the text classification system 101. In real-time, a text may be provided to the text classification system 101 for determining the classification of the text. The text for which the classification is to be determined may be provided by a user 103 via a GUI (not shown in figure). In an embodiment, the user 103 may communicate with the text classification system 101 through a user device (not shown in figure) via the communication network 102. In an embodiment, the communication network 102 may include, without limitation, a direct interconnection, local area network (LAN), wide area network (WAN), wireless network (e.g., using Wireless Application Protocol), the Internet, etc. In an embodiment, at least one of the plurality of texts received by the text classification system 101 may be cleaned to remove irrelevant data associated with received text. In an embodiment, cleaning may be performed by one or more techniques known to a person skilled in art.

In real-time, when the text from the plurality of texts is received from the user 103, a first vector representation and a second vector representation of the text is generated. In an embodiment, the text may be unknown to the user and the text may be retrieved directly from the data source 105. The first vector representation may be generated using first trained model parameters of a first LSTM unit and the second vector representation may be generated using second trained model parameters of a second LSTM unit. The first and second trained model parameters are obtained based on the training of the text classification system 101 using the plurality of similar pair of texts and the plurality of dissimilar pair of texts. For the training using the plurality of similar pair of texts and the plurality of dissimilar pair of texts, initially, a first text and a second text, from the plurality of texts, is received by the text classification system 101. The first text and the second text are one of the plurality of similar pair of texts and one of the plurality of dissimilar pair of texts. For example, consider, $X_1, X_2, X_3 \ldots X_N$ to be the plurality of texts. Each of the first text and the second text may be one of $X_1, X_2, X_3 \ldots X_N$. Consider the $X_1$, $X_3$ and $X_5$ may be one of same and similar texts and $X_2$, $X_4$ and $X_N$ may be different texts. The plurality of similar pair of texts may be $X_1X_3$, $X_2X_4$, $X_5X_1$ and the like. The plurality of dissimilar pair of texts may be $X_1X_2$, $X_1X_6$, $X_4X_1$, $X_2X_5$ and the like. Upon receiving the first text and the second text, a first labeled text for the first text and a second labeled text for the second text is generated based on plurality of labels retrieved from the data source 105 associated with the text classification system 101. In an embodiment, the plurality of labels may also be referred to plurality of categories associated with the plurality of texts. Consider, the plurality of labels to be $L_1, L_2, L_3 \ldots L_M$. If first text is $X_1$ and the second text is $X_2$, and $L_2$ of the plurality of labels is associated with the first text $X_1$ and $L_1$ is associated with the second text $X_2$, then the first labeled text may be $X_1L_2$ and the second labeled text may be $X_2L_1$.

Upon generating the first labeled text and the second labeled text, a third vector representation of the first text is generated using first model parameters of the first LSTM unit and a fourth vector representation of the second text is generated using second model parameters of the second LSTM unit. In an embodiment, the first model parameters may be characteristics defining model associated with the first LSTM unit and second model parameters may be characteristics defining model associated with the second LSTM unit.

Further, the first model parameters and the second model parameters are modified to obtain the first trained model parameters and the second trained model parameters respectively. The modification may be based on norm distance associated between the third vector representation and the fourth vector representation. In an embodiment, the norm distance may be distance between the third vector representation and the fourth vector representation. In an embodiment, the norm distance may be based on the plurality of labels associated with the first text and the second text. In an embodiment, the norm distance may be minimal when the labels in the first labeled text and the second labeled text are one of same and similar, and the norm distance may be maximum when the labels in the first labeled text and the second labeled text are different. In an embodiment, the modification of the first model parameters and the second model parameters includes proximating exponential of the negative of norm distance to value zero for the dissimilar pair of texts and proximating the exponential of the negative of norm distance to value one for the similar pair of texts. For example, consider the first labeled text is $X_1L_2$ and the second labeled text is $X_2L_2$, then the norm distance may be minimal since the labels are same. The exponential of the negative of norm distance may be close to value one. The model parameters are modified such that the exponential of the negative of the norm distance is proximated to value one. In another example, consider the first labeled text is $X_1L_1$ and the second labeled text is $X_2L_2$, then the norm distance may be maximum since the labels are different. The exponential of the negative of norm distance may be close to value zero. The model parameters are modified such that the exponential of the negative of norm distance is proximated to value zero. In an embodiment, the exponential of the negative of norm distance may be as shown in equation 1:

$$\exp(-|X_1L_1-X_2L_2|) \qquad (1)$$

Further, in the real-time, the first vector representation and the second vector representation are combined using a combiner operator to obtain a combined vector representation. The combiner operator is selected from a plurality of combiner operators based on the accuracy of a classifier 104 of the text classification system 101 obtained during the training of the text classification system 101. In an embodiment, the plurality of combiner operators may be any of operators, known to a person skilled in art, configure to combine vector representations and provide a combined vector representation. In an embodiment, the plurality of combiner operators may be, but not limited to, addition, subtraction, multiplication, division and weighted averaging. The selection of the combiner operator is performed at real-time based on the training. During the training, each of the plurality of texts may be received. Further, a fifth vector representation and a sixth vector representation may be generated for each of the plurality of texts. The fifth vector representation may be generated using the first trained model parameters of the first LSTM unit and the sixth vector representation may be generated using the second trained model parameters of the second LSTM unit. The fifth vector representation and the sixth vector representation are combined. The combining may be performed using each of the plurality of combiner operators to obtain corresponding plurality of combined vector representations for each of the plurality of texts. Further, the plurality of combined vector representations is provided to the classifier 104 to obtain classification for each of the plurality of combined vector representations. The classifier 104 provides the classification for each of the plurality of combined vector representations 214 to the text classification system 101. Accuracy for each of the classification is determined, by the text classification system 101, using one or more techniques, known to a person skilled in art. In an embodiment, the accuracy may be determined by comparing the classification for each of the plurality of combined vector representations 214 with pre-defined classification retrieved from the data source 105. At real-time, the combiner operator is selected from the plurality of combiner operators, for the combining based on the accuracy of the classification of the plurality of combined vector representations. In an embodiment, each of the plurality of texts may be associated with a combiner operator from the plurality of combiner operators based on the accuracy. In an embodiment, the combiner operator may be selected based on maximum value of the accuracy. In an embodiment, the text classification system 101 may be configured to store the combiner operator corresponding to each of the plurality of texts. For example, if the selected combiner operator is addition for a text from plurality of texts, the text classification system 101 may be configured to store addition as the combiner operator. The stored combiner operator may be retrieved when the text is received at real-time.

Further at real-time, upon receiving the combined vector representation generated based on the selection using the accuracy, the combined vector representation is provided to the classifier 104 for determining a classification of the text. The classifier 104 may be a machine learning model configured to determine the classification of the text. In an embodiment, the classifier 104 may be the one or more classification methods, known to a person skilled in the art.

In an embodiment, the text classification system 101 receives data including at least one of the plurality of texts, plurality of classifications, plurality of labels and other associated data for determining the classification of the text via a communication network (not shown in figure) through the I/O interface 107 of the text classification system 101. Also, the text classification system 101 provides output via the I/O interface 107. In one embodiment, the output may be provided to at least one of the user 103, the classifier 104, any other display unit (not shown in Figure) associated with the text classification system 101. In an embodiment, the output may be stored in the data source 105. Further, the I/O interface 107 may be coupled with the processor 106 of the text classification system 101.

Figure 2:
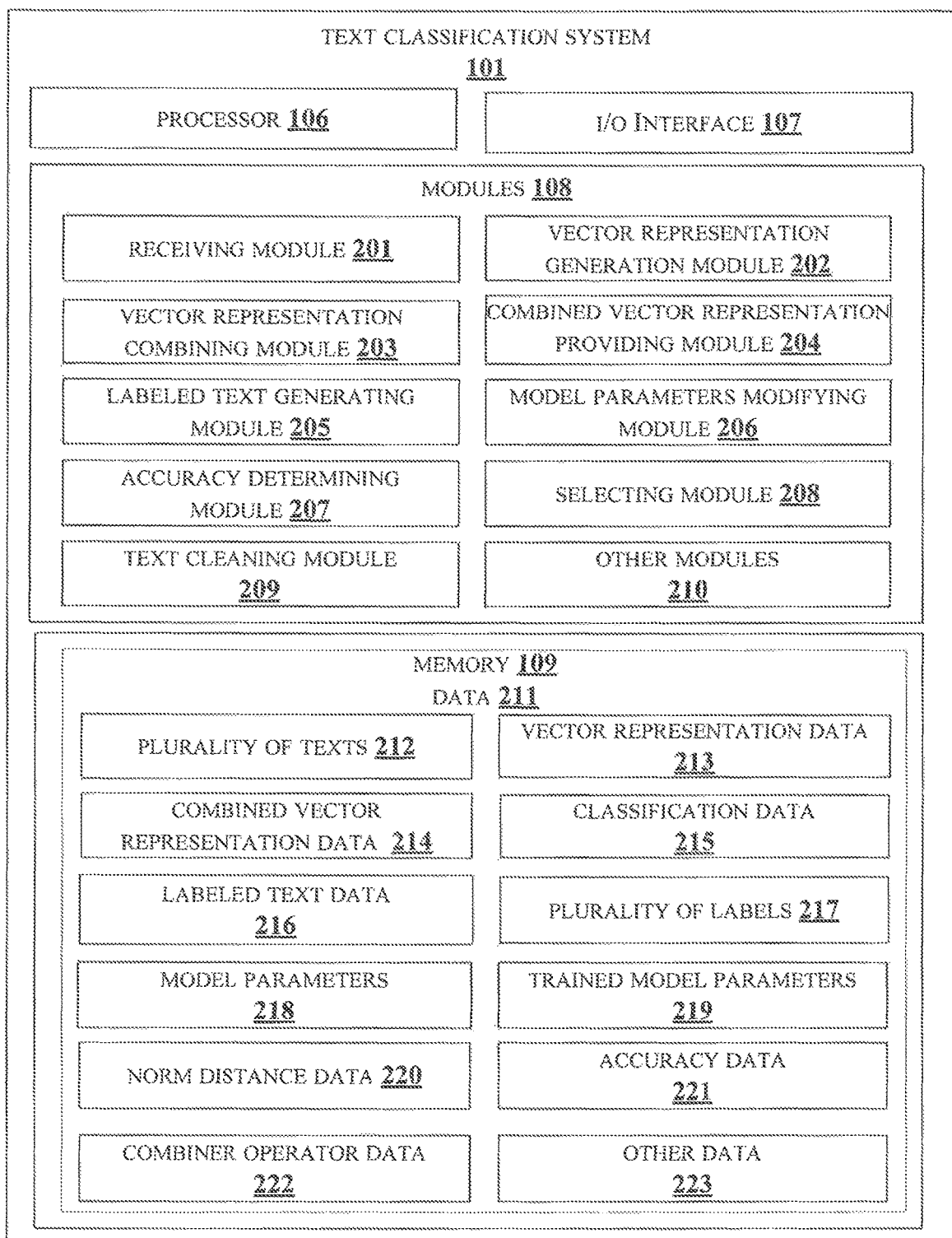
FIG. 2 shows a detailed block diagram of a text classification system in accordance with some embodiments of the present disclosure.

FIG. 2 shows a detailed block diagram of the text classification system 101 in accordance with some embodiments of the present disclosure. Data 211 in the memory 109 and one or more modules 108 of the text classification system 101 may be described herein in detail.

In one implementation, the one or more modules 108 may include, but are not limited to, a receiving module 201, a vector representation generation module 202, a vector representation combining module 203, a combined vector representation providing module 204, a labeled text generating module 205, model parameters modifying module 206, accuracy determining module 207, selecting module 208, text cleaning module 209 and one or more other modules 210 associated with the text classification system 101.

In an embodiment, the data 211 in the memory 109 may include plurality of texts 212, vector representation data 213 (also referred as one of the first vector representation, the second vector representation, the third vector representation, the fourth vector representation, the fifth vector representation and the sixth vector representation), combined vector representation data 214 (also referred as one of the combined vector representation and plurality of combined vector representations), classification data 215 (also referred as one of the classification and the plurality of classifications), labeled text data 216 (also referred as one of the first labeled text and the second labeled text), a plurality of labels 217, model parameters 218 (also referred as one of the first model parameters and the second model parameters), trained model parameters 219 (also referred as one of the first trained model parameters and the second trained model parameters), norm distance data 220 (also referred as the norm distance 220) the accuracy data 221 (also referred as the accuracy 221), combiner operator data 222 (also referred as one of the combiner operator and the plurality of combiner operators) and other data 223 associated with the text classification system 101.

In an embodiment, the data 211 in the memory 109 may be processed by the one or more modules 108 of the text classification system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

The text classification system 101 may be implemented with the classifier 104 for determining the classification of the text. The text classification system 101 may be trained for configuring the text classification system 101 to perform one or more steps in real-time. In an embodiment, the text classification system 101 may be trained without interference from the user 103. In an embodiment, the text classification system 101 may be trained using a learning module. For example, consider a ticketing management system where a user 103 raises a ticket which may be relating to an issue faced by the user 103. The classifier 104 may be required to determine the possible classes associated with the ticket and categorize the ticket. By categorizing, the ticket may be sent to concerned department of the ticketing management system and the issue may be resolved. In such scenarios, the ticket may relate to issues including, but not limited to, at least one of hardware issue, networking issues, software installation issue, licensing issues, procurement request issue and the like. In the present disclosure, the ticket may be in form of the text and provided to the text classification system 101. In an embodiment, the text may be "unable to send emails", "no internet access" and the like. In this example, the text classification system 101 along with the classifier 104 may be configured to determine the classification 215 of the text, for example the ticket.

Figure 6A:
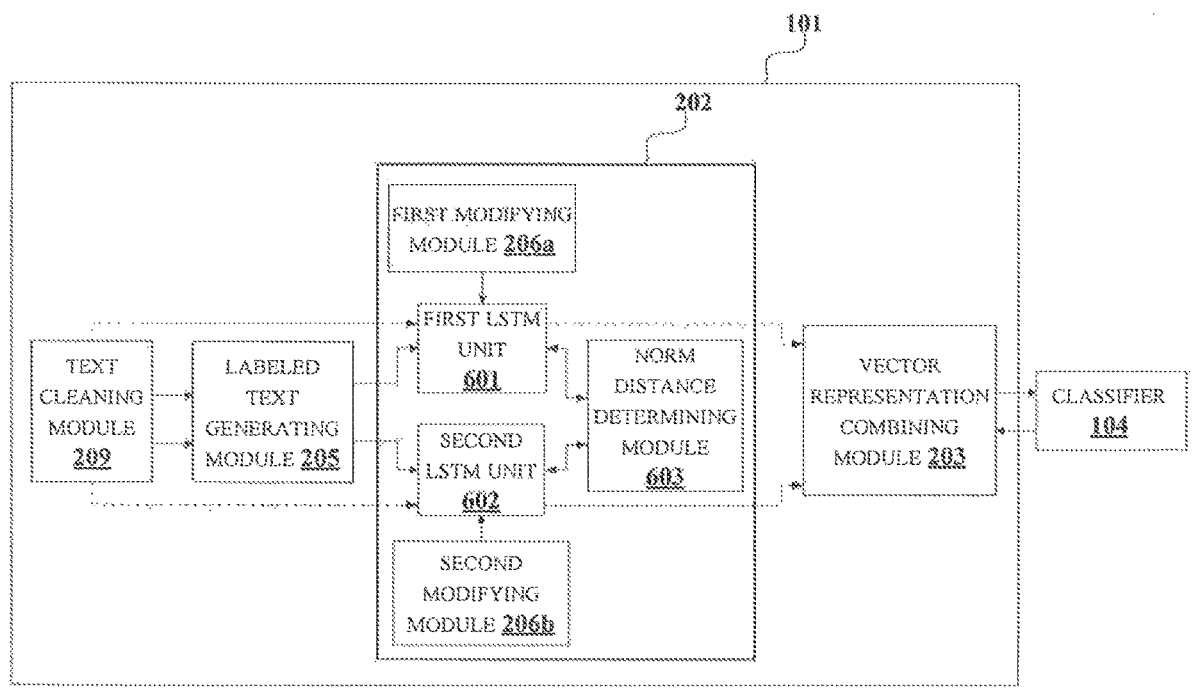
FIG. 6a illustrates a schematic block diagram showing training of a text classification system for determining classification of text in accordance with some embodiments of present disclosure.
Figure 6B:
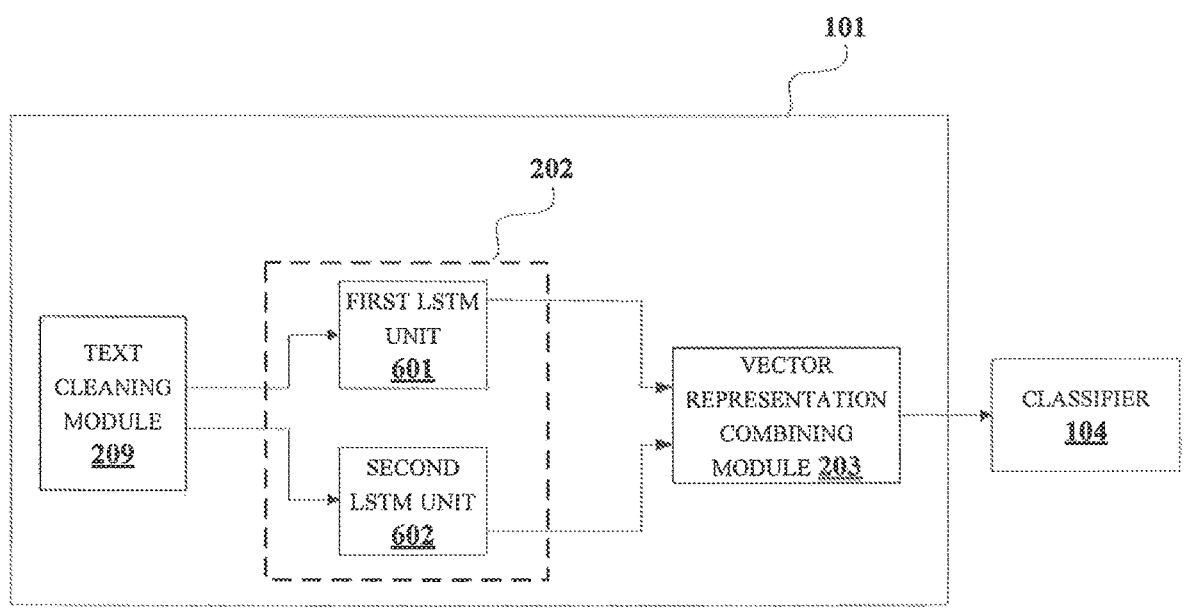
FIG. 6b illustrates a schematic block diagram showing determination of classification of text by a text classification system in accordance with some embodiments of present disclosure.

FIG. 6b illustrates the schematic block diagram illustrating the one or more steps associated with the text classification system 101 in real-time. In real-time, when the text from the plurality of texts 212 is received from the user 103 by the receiving module 201. In an embodiment, the text may be cleaned by the text cleaning module 209 to remove irrelevant data associated with the text. In an embodiment, one or more techniques, known to a person skilled in art, for cleaning the text may be implemented in the present disclosure. Further, the first vector representation 213 and the second vector representation 213 of the text is generated by the vector representation generation module 202. The first vector representation 213 may be generated using the first trained model parameters 219 of the first LSTM unit 601 of the vector representation generation module 202 and the second vector representation 213 may be generated using second trained model parameters 219 of the second LSTM unit 602 of vector representation generation module 202. In an embodiment, the first LSTM unit 601 and the second LSTM unit 602 may be configured to receive and provide a vector representation 213 of the text. The first and second trained model parameters 219 are obtained based on the training using the plurality of similar pair of texts and the plurality of dissimilar pair of texts. For the training using the plurality of similar pair of texts and the plurality of dissimilar pair of texts, initially, the first text and the second text is received by the first LSTM unit 601 and the second LSTM 602 of the text classification system 101 respectively, as illustrated in FIG. 6a. In an embodiment, the first text and the second text may be cleaned by the text cleaning module 209 to remove the irrelevant data associated with the first text and the second text. The first text and the second text are one of the plurality of similar pair of texts and one of the plurality of dissimilar pair of texts. In an embodiment, one or more techniques, known to a person skilled in art, for cleaning the first text and the second text may be implemented in the present disclosure.

Upon receiving the first text and the second text, the first labeled text 216 for the first labeled text and the second labeled text 216 for the second text are generated by the labeled text generating module 205 based on plurality of labels 217 retrieved from the data source 105 associated with the text classification system 101. In an embodiment, the first labeled text 216 and the second labeled text 216 may be generated in form of a tuple.

Upon generating the first labeled text 216 and the second labeled text 216, a third vector representation 213 of the first text is generated by the vector representation generation module 202 using the first model parameters 218 of the first LSTM unit 601. Further, the fourth vector representation 213 of the second text is generated by the vector representation generation module 202 using the second model parameters 218 of the second LSTM unit 602.

In an embodiment, the first model parameters 218 may be characteristics defining model associated with the first LSTM unit 601 and second model parameters 218 may be characteristics defining model associated with the second LSTM unit 602.

Further, the first model parameters 218 and the second model parameters 218 are modified by the model parameters modifying module 206 to obtain the first trained model parameters 219 and the second trained model parameters 219 respectively. A first modifying module 206a of the model parameters modifying module 206, as shown in FIG. 6a, may be configured to modify the first model parameters 218 for obtaining the first trained model parameters 219. A second modifying module 206b of the model parameters modifying module 206, as shown in FIG. 6a, may be configured to modify the second model parameters 218 for obtaining the second trained model parameters 219. In an embodiment, the first modifying module 206a may be configured within the first LSTM unit 601 and the second modifying module 206b may be configured within the second LSTM unit 602. The modification may be based on the norm distance 220 associated between the third vector representation 213 and the fourth vector representation 213. The norm distance 220 may be determined by a norm distance determining module 603 of the vector representation generation module 202. In an embodiment, the norm distance 220 may be determined by one or more techniques known to the person skilled in the art. In an embodiment, the norm distance 220 may be the distance between the third vector representation 213 and the fourth vector representation 213. In an embodiment, the norm distance 220 may be based on the plurality of labels 217 associated with the first text and the second text. In an embodiment, the norm distance 220 may be minimal when the labels in the first labeled text 216 and the second labeled text 216 are same or similar and the norm distance 220 may be maximum when the labels in the first labeled text 216 and the second labeled text 216 are different. In an embodiment, the modification of the first model parameters 218 and the second model parameters 218 includes proximating exponential of negative of the norm distance 220 to value zero for the dissimilar pair of texts and proximating the exponential of negative of the norm distance 220 to value one for the similar pair of texts. In an embodiment, the proximation may be achieved by modifying the first model parameters 218 and the second model parameters 218.

In an embodiment, the LSTM unit which are trained by modifying the model parameters, experience a huge training sample pairs which may be equal to $^{N}C_2$, where n indicates total sample size. As the LSTM units learns to discriminate between each sample (also referred as text) pairs, capability to project a given text into its n-dimensional representation even though the sample size n is small, is achieved accurately.

Further, in the real-time, as shown in FIG. 6b, the first vector representation 213 and the second vector representation 213, from the first LSTM unit 601 and the second LSTM unit 602, are combined, by the vector representation combining module 203, using the combiner operator 222 to obtain the combined vector representation 214. The combiner operator 222 is selected, by the selecting module 208, from the plurality of combiner operators 222 based on the selection using accuracy 221 of the classifier 104 of the text classification system 101. In an embodiment, the plurality of combiner operators 222 may be, but not limited to, addition, subtraction, multiplication, division and weighted averaging. For the selection using the accuracy 221 of the classifier 104, the fifth vector representation 213 and the sixth vector representation 213 is generated for each of the plurality of texts 212. As shown in FIG. 6a, each of the plurality of texts 212 is provided to the first LSTM unit 601 and the second LSTM unit 602 (indicated in dotted lines in FIG. 6a). In an embodiment, each of the plurality of texts provided to the first LSTM unit 601 and the second LSTM unit 602 may be cleaned by the text cleaning module 209. Each of the plurality of texts may be cleaned to remove irrelevant data. The fifth vector representation 213 may be generated using the first trained model parameters 219 of the first LSTM unit 601 and the sixth vector representation 213 may be generated using the second trained model parameters 219 of the second LSTM unit 602. The fifth vector representation 213 and the sixth vector representation 213 are provided to the vector representation combining module 203 by the first LSTM unit 601 and the second LSTM unit 602 respectively (indicated in dotted lines in FIG. 6a) shown in FIG. 6a. During training of the text classification system 101, the combining may be performed using each of the plurality of combiner operators 222 to obtain corresponding plurality of combined vector representations 214 for fifth and sixth vector representation 213 obtained for each of the plurality of texts 212. Further, the plurality of combined vector representations 214 are provided to the classifier 104 by the combined vector representation providing module 204, as shown in FIG. 6a to obtain classification 215 for each of the plurality of combined vector representations 214. In an embodiment, the classification 215 for each of the plurality of combined vector representation 214 may be received by the text classification system 101. Accuracy 221 for each of the classification 215 is determined by the accuracy determining module 207 associated with the text classification system 101. In an embodiment, the accuracy 221 may be determined by performing one or more techniques known to person skilled in art. The combiner operator 222 from the plurality of combiner operators 222, for the combining performed at the real-time, may be selected based on the accuracy 221 of the classification 215 of the plurality of combined vector representations 214. In an embodiment, the combiner operator 222 may be of associated with each of the plurality of texts 212 and stored in a data source 105. The accuracy may be associated based on maximum value of the accuracies obtained for each of the classification for each of the combiner operators.

In real-time, upon generating the combined vector representation 214 generated based on the selection using the accuracy 221, the combined vector representation 214 is provided to the classifier 104 by the combined vector representation 214 providing module 204, as shown in FIG. 6b, for determining the classification 215 of the text. The classifier 104 may be a machine learning model configured to determine the classification 215 of the text.

Figure 3:
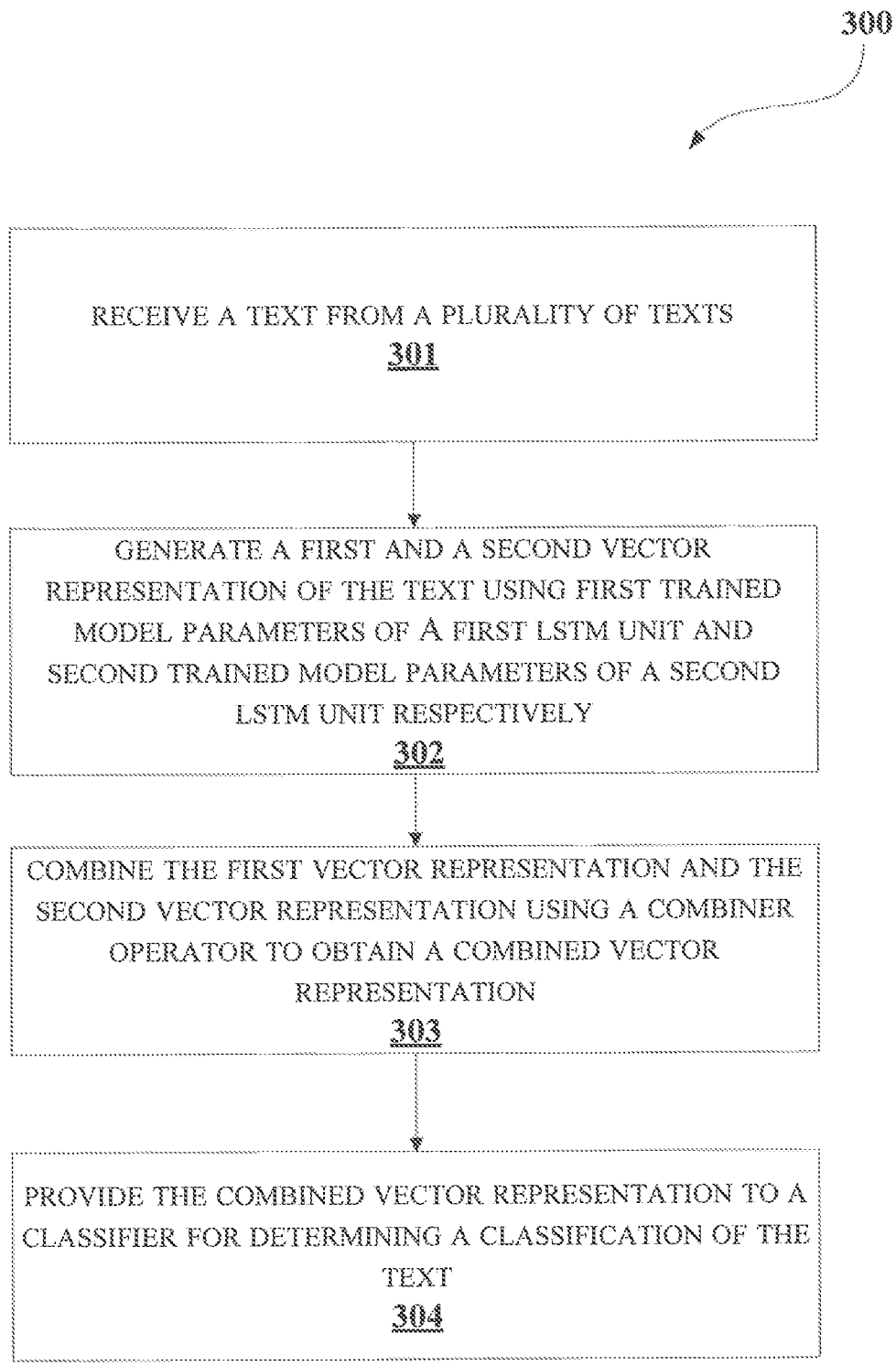
FIG. 3 illustrates a flowchart showing a method for determining classification of text in accordance with some embodiments of present disclosure.

FIG. 3 illustrates a flowchart showing a method 300 for determining classification 215 of text in accordance with some embodiments of present disclosure.

At block 301, the method 300 includes receiving the text from a plurality of texts 212 by the receiving module 201. The text may be provided by the user 103 to the text classification system 101.

At block 302, the method 300 includes generates a first vector representation 213 of the text using the first trained model parameters 219 of the LSTM unit and the second vector representation 213 of the text using the second trained model parameters 219 of the second LSTM unit 602 by the vector representation generation module 202. The first and second trained model parameters 219 are obtained based on training of the text classification system 101 using the plurality of similar pair of texts and the plurality of dissimilar pair of texts from the plurality of texts 212.

At block 303, the method 300 includes combining the first vector representation 213 and the second vector representation 213 using the combiner operator 222 to obtain a combined vector representation 214 by the vector representation combining module 203. The combiner operator 222 is selected from a plurality of combiner operators 222 based on the selection using accuracy 221 of the classifier 104 associated with the text classification system 101.

At block 304, the method 300 includes providing the combined vector representation 214 to the classifier 104 by the combined vector representation providing module 204. The classifier 104 may be configured to determine the classification 215 of the text.

Figure 4:
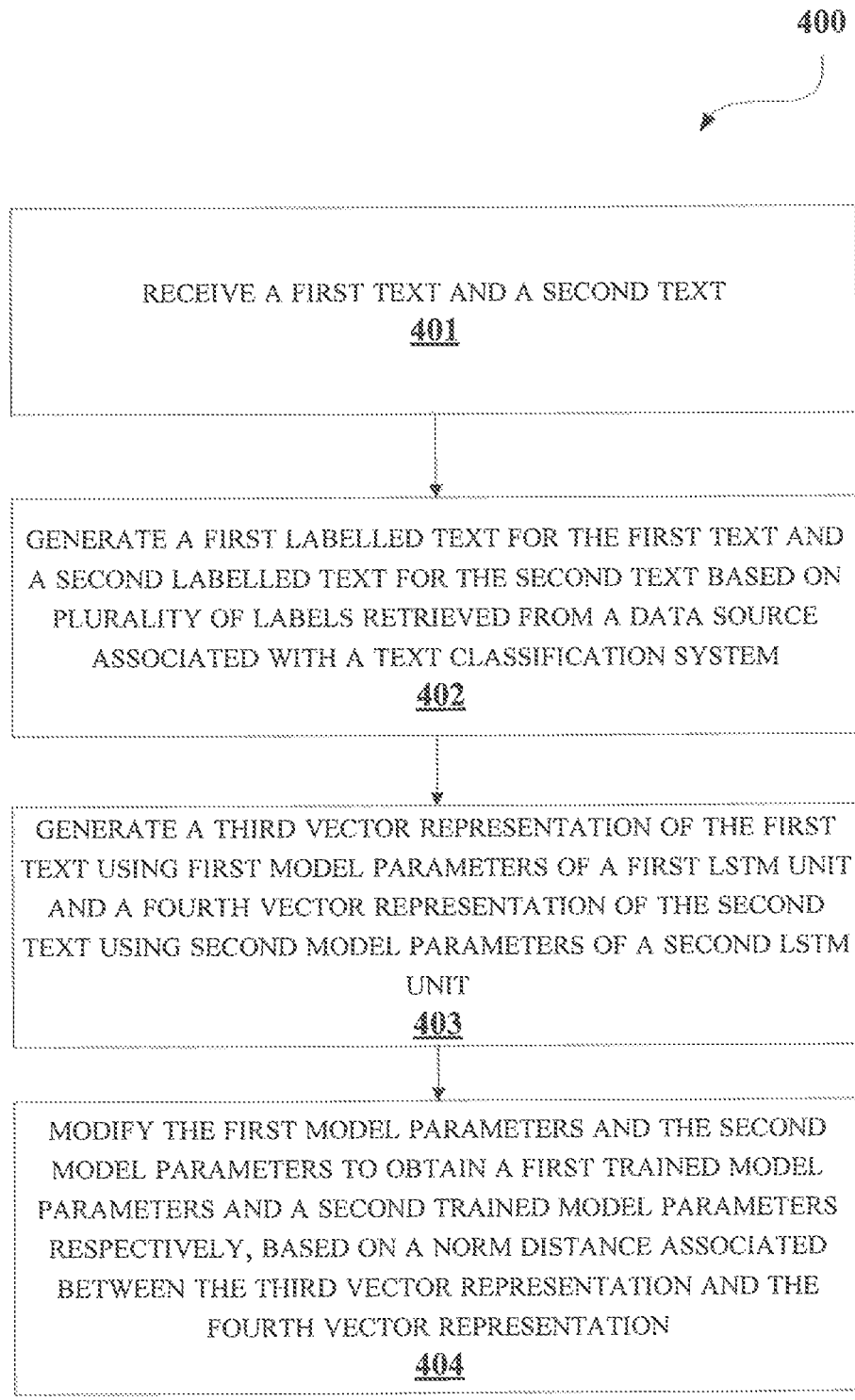
FIG. 4 illustrates a flowchart showing a method for training a text classification system using similar pair of text and dissimilar pair of text in accordance with some embodiments of present disclosure.

FIG. 4 illustrates a flowchart showing a method 400 for training the text classification system 101 using similar pair of texts and dissimilar pair of texts in accordance with some embodiments of present disclosure;

At block 401 the method 400 includes receiving the first text and the second text by the receiving module 201. The first text and the second text may be one of the plurality of similar pair of texts and one of the plurality of dissimilar pair of texts from the plurality of texts 212. The first text and the second text may be provided by the user 103.

At block 402, the method 400 includes generating the first labeled text 216 for the first text and the second labeled text 216 for the second text based on the plurality of labels 217 retrieved from the data source 105 associated with the text classification system 101 by the labeled text generating module 205.

At block 403, the method 400 includes generating a third vector representation 213 of the first text using the first model parameters 218 of the first LSTM unit 601 and the fourth vector representation 213 of the second text using the second model parameters 218 of the second LSTM unit 602 by the vector representation generation module 202.

At block 404, the method 400 includes modifying the first model parameters 218 and the second model parameters 218 to obtain the first trained model parameters 219 and the second trained model parameters 219 respectively based on the norm distance 220 associated between the third vector representation 213 and the fourth vector representation 213 by the model parameters modifying module 206.

Figure 5:
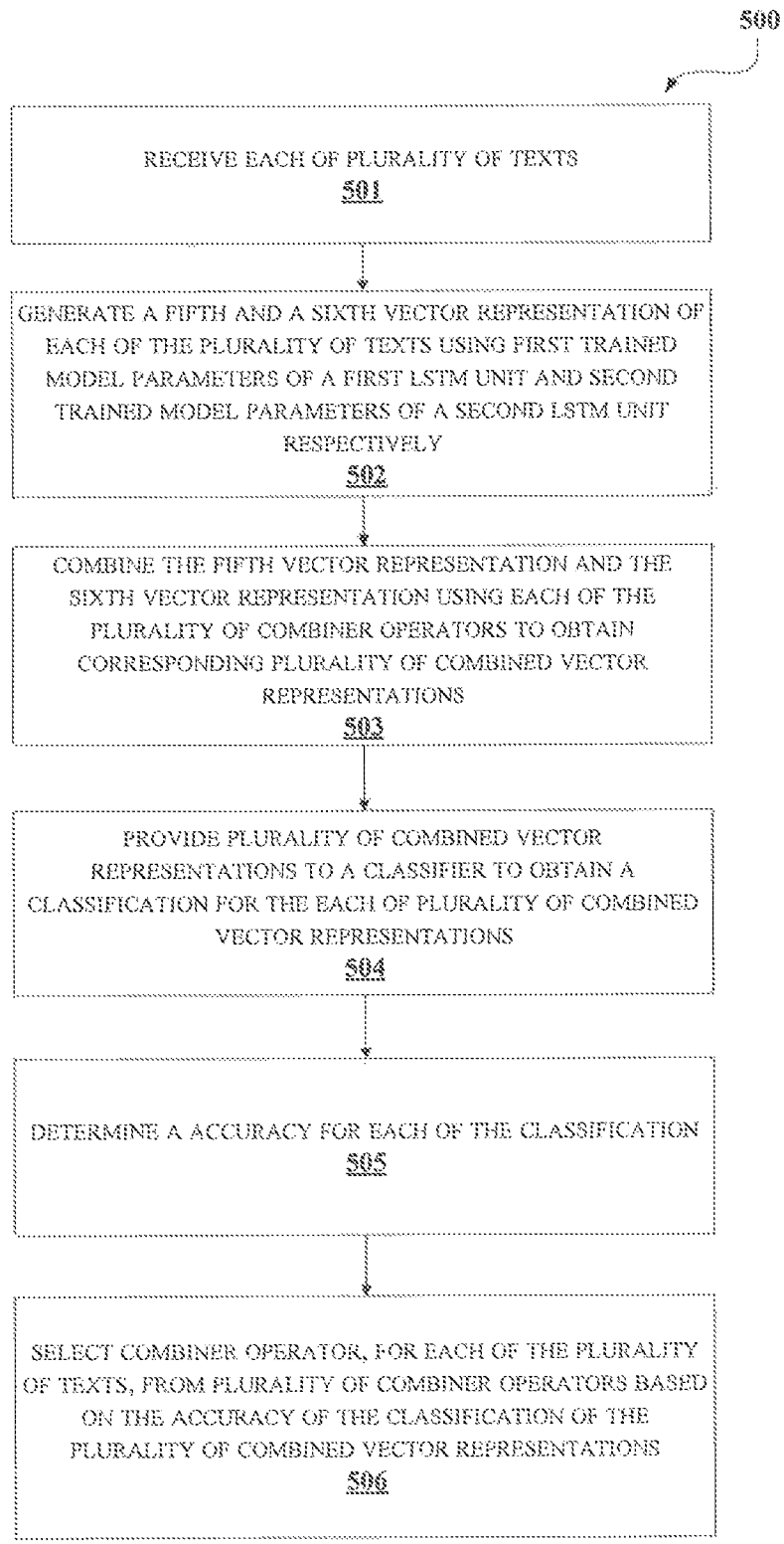
FIG. 5 illustrates a flowchart showing a method for selecting combiner operator in accordance with some embodiments of present disclosure.

FIG. 5 illustrates a flowchart showing a method 500 for selecting combiner operator 222 in accordance with some embodiments of present disclosure.

At block 501, the method 500 includes receiving each of the plurality of texts 212 by the receiving module 201.

At block 502, the method 500 includes generating a fifth vector representation 213 for each of the plurality of texts 212 using the first trained model parameters 219 of the first LSTM unit 601 and a sixth vector representation 213 for each of the plurality of texts 212 using the second trained model parameters 219 of the second LSTM unit 602 by the vector representation generating module.

At block 503, the method 500 includes combining the fifth vector representation 213 and the sixth vector representation 213 using each of the plurality of combiner operators to obtain the corresponding plurality of combined vector representations 214 by the vector representation combining module 203. In an embodiment, the plurality of combiner operators may include, but not limited to, addition, multiplication, division and subtraction.

At block 504, the method 500 includes providing the plurality of combined vector representations 214 to the classifier 104 to obtain classification 215 for each of the plurality of combined vector representations 214 by the combined vector representation providing module 204.

At block 505, the method 500 includes determining the accuracy 221 for each of the classification 215 obtained from the classifier 104 by the accuracy determining module 207. In an embodiment, the accuracy 221 of the classification 215 may be determined by one or more techniques known to the person skilled in art.

At block 506, the method 500 includes selecting the combiner operator from the plurality of combiner operators, based on the accuracy 221 of the classification 215 of the plurality of combined vector representations 214 by the selecting module 208. In an embodiment, the combiner operator associated with maximum value of the accuracy 221 may be selected.

As illustrated in FIG. 3, FIG. 4 and FIG. 5, the methods 300, 400 and 500 may include one or more blocks for executing processes in the text classification system 101. The method 300, 400 and 500 may be described in the general context of computer executable instructions. Generally, computer executable instructions can include routines, programs, objects, components, data structures, procedures, modules, and functions, which perform particular functions or implement particular abstract data types.

The order in which the methods 300, 400 and 500 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 7:
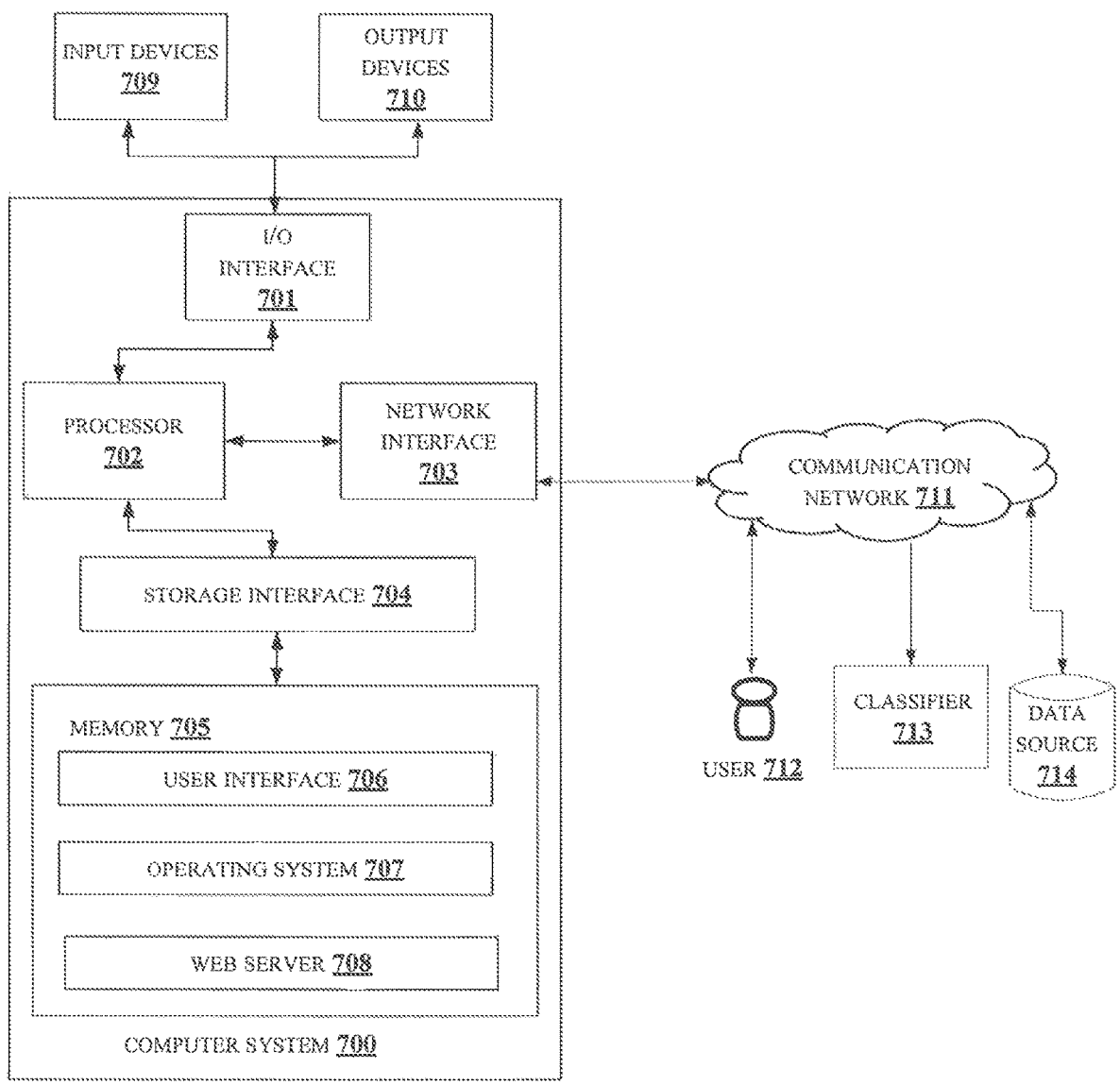
FIG. 7 illustrates a block diagram of an exemplary computer system for implementing embodiments consistent with the present disclosure.

FIG. 7 illustrates a block diagram of an exemplary computer system for implementing embodiments consistent with the present disclosure. In an embodiment, the computer system 700 is used to implement the text classification system 101. The computer system 700 may include a central processing unit ("CPU" or "processor") 702. The processor 702 may include at least one data processor for executing processes in text classification system 101. The processor 702 may include specialized processing units such as, integrated system (bus) controllers, memory management control units, floating point units, graphics processing units, digital signal processing units, etc.

The processor 702 may be disposed in communication with one or more input/output (I/O) devices 709 and 710 via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices 709 and 710. For example, the input devices 709 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 710 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 consists of a text classification system 101. The processor 702 may be disposed in communication with the communication network 711 via a network interface 703. The network interface 703 may communicate with the communication network 711. The network interface 703 may employ connection protocols including, without limitation, direct connect, Ethernet (ex., twisted pair 10/100/1000 Base T), transmission control protocol/internet protocol (TCP/IP), token ring, IEEE 802.11a/b/g/n/x, etc. The communication network 711 may include, without limitation, a direct interconnection, local area network (LAN), wide area network (WAN), wireless network (e.g., using Wireless Application Protocol), the Internet, etc. Using the network interface 703 and the communication network 711, the computer system 700 may communicate with a user 712, a classifier 713 and a data source 714 for determining classification of a text. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/n/n/x, etc.

The communication network 711 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, a user interface 706, an operating system 707, a web server 708, and the like. In some embodiments, computer system 700 may store user/application data, such as, the data, variables, records, etc., as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Flat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides a method for enhancing performance and generalization of a classifier by performing the training as disclosed in the present disclosure.

An embodiment of the present disclosure is suitable when dataset is not large enough to generalize characteristics associated with a classifier.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Text classification system |
| 102 | Communication network |
| 103 | User |
| 104 | Classifier |
| 105 | Data source |
| 106 | Processor |
| 107 | I/O interface |
| 108 | Modules |
| 109 | Memory |
| 201 | Receiving module |
| 202 | Vector representation generation module |
| 203 | Vector representation combining module |
| 204 | Combined vector representation providing module |
| 205 | Labeled text generating module |
| 206 | Model parameters modifying module |
| 207 | Accuracy determining module |

-continued

| Reference Number | Description |
|---|---|
| 208 | Selecting module |
| 209 | Text cleaning module |
| 210 | Other modules |
| 211 | Data |
| 212 | Plurality of texts |
| 213 | Vector representation data |
| 214 | Combined vector representation data |
| 215 | Classification data |
| 216 | Labeled text data |
| 217 | Plurality of labels |
| 218 | Model parameters |
| 219 | Trained model parameters |
| 220 | Norm distance data |
| 221 | Accuracy data |
| 222 | Combiner operator data |
| 223 | Other data |
| 601 | First LSTM unit |
| 602 | Second LSTM unit |
| 603 | Norm distance determining module |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Input Devices |
| 710 | Output Devices |
| 711 | Communication Network |
| 712 | User |
| 713 | Classifier |
| 714 | Data source |

We claim:

1. A method for determining classification of text, comprising:
   receiving, by a text classification system; a text from a plurality of texts;
   training the text classification system using a plurality of similar pair of texts and a plurality of dissimilar pair of texts from the plurality of texts to obtain first trained model parameters of a first Long Short Term Memory (LSTM) program and second trained model parameters of a second LSTM program;
   generating, by the text classification system, a first vector representation of the text using the first trained model parameters of the first LSTM unit and a second vector representation of the text using the second trained model parameters of the second LSTM unit;
   combining, by the text classification system, the first vector representation and the second vector representation using a combiner operator to obtain a combined vector representation, wherein the combiner operator is selected from a plurality of combiner operators based on the training using an accuracy value of a classifier of the text classification system, wherein the accuracy value of the classifier is determined by comparing a classification performed by the classifier with a predefined classification stored in a data source associated with the text classification system; and
   providing, by the text classification system, the combined vector representation to the classifier for determining a classification of the text.

2. The method as claimed in claim 1, further comprising:
   cleaning, by the text classification system, the text to remove irrelevant data from the text.

3. The method as claimed in claim 1, wherein the training using the similar pair of texts and the dissimilar pair of texts comprises:
   receiving, by the text classification system, a first text and a second text, wherein the first text and the second text are one of the plurality of similar pair of texts and one of the plurality of dissimilar pair of texts;
   generating, by the text classification system, a first labeled text for the first text and a second labeled text for the second text based on a plurality of labels retrieved from the data source, the first labeled text is generated by pairing the first text with a first label of the plurality of labels that corresponds to the first text and the second labeled text is generated by pairing the second text with a second label of the plurality of labels that corresponds to the second text;
   generating, by the text classification system, a third vector representation of the first text using first model parameters of the first LSTM unit and a fourth vector representation of the second text using second model parameters of the second LSTM unit; and
   modifying, by the text classification system, the first model parameters and the second model parameters to obtain the first trained model parameters and the second trained model parameters respectively based on norm distance associated between the third vector representation and the fourth vector representation.

4. The method as claimed in claim 3, wherein the plurality of labels comprises a plurality of categories associated with the plurality of texts.

5. The method as claimed in claim 3, wherein modifying the first model parameters and the second model parameters comprises approximating exponential of the negative of norm distance to value zero for the dissimilar pair of texts and approximating the exponential of the negative of norm distance to value one for the similar pair of texts.

6. The method as claimed in claim 1, wherein selecting the combiner operator comprises:
   receiving, by the text classification system, each of the plurality of texts;
   generating, by the text classification system, a fifth vector representation for each of the plurality of texts using the first trained model parameters of the first LSTM unit and a sixth vector representation for each of the plurality of texts using the second trained model parameters of the second LSTM unit;
   combining, by the text classification system, the fifth vector representation and the sixth vector representation, for each of the plurality of texts, using each of the plurality of combiner operators to obtain corresponding a plurality of combined vector representations;
   providing, by the text classification system, each of the plurality of combined vector representations to the classifier to obtain classification for each of the plurality of combined vector representations;
   determining, by the text classification system, an accuracy value for each of the classification, wherein the accuracy value for each of the classification is determined by comparing each of the classification with a predefined classification stored in a data source associated with the text classification system; and
   selecting, by the text classification system, the combiner operator, for each of the plurality of texts, from the plurality of combiner operators, based on a magnitude of the accuracy value of the classification of the plurality of combined vector representations.

7. A text classification system for determining classification of text, comprises:
   a processor; and
   a memory communicatively coupled to the processor, wherein the memory stores processor-executable instructions, which, on execution, cause the processor to:
      receive a text from a plurality of texts;
      perform a training of the text classification system using a plurality of similar pair of texts and a plurality of dissimilar pair of texts from the plurality of texts, to obtain first trained model parameters of a first Long Short Term Memory (LSTM) unit and second trained model parameters of a second LSTM unit;
      generate a first vector representation of the text using the first trained model parameters of the first LSTM unit and a second vector representation of the text using the second trained model parameters of the second LSTM unit;
      combine the first vector representation and the second vector representation using a combiner operator to obtain a combined vector representation, wherein the combiner operator is selected from a plurality of combiner operators based on the training using an accuracy value of a classifier of the text classification system, wherein the accuracy value of the classifier is determined by comparing a classification performed by the classifier with a predefined classification stored in a data source associated with the text classification system; and
      provide the combined vector representation to the classifier for determining a classification of the text.

8. The text classification system as claimed in claim 7, wherein the processor-executable instructions, on execution, further cause the processor to clean the text to remove irrelevant data from the text.

9. The text classification system as claimed in claim 7, wherein the training using the similar pair of texts and the dissimilar pair of texts, comprises:
   receiving a first text and a second text, wherein the first text and the second text are one of the plurality of similar pair of texts and one of the plurality of dissimilar pair of texts;
   generating a first labeled text for the first text and a second labeled text for the second text based on a plurality of labels retrieved from the data source, the first labeled text is generated by pairing the first text with a first label of the plurality of labels that corresponds to the first text and the second labeled text is generated by pairing the second text with a second label of the plurality of labels that corresponds to the second text;
   generating a third vector representation of the first text using first model parameters of the first LSTM unit and a fourth vector representation of the second text using second model parameters of the second LSTM unit; and
   modifying the first model parameters and the second model parameters to obtain the first trained model parameters and the second trained model parameters respectively based on norm distance associated between the third vector representation and the fourth vector representation.

10. The text classification system as claimed in claim 9, wherein the plurality of labels comprises a plurality of categories associated with the plurality of texts.

11. The text classification system as claimed in claim 9, wherein modifying the first model parameters and the second model parameters comprises approximating exponential of the negative of norm distance to value zero for the dissimilar pair of texts and approximating the exponential of the negative of norm distance to value one for the similar pair of texts.

12. The text classification system as claimed in claim 7, wherein selecting the combiner operator comprises:
   receiving each of the plurality of texts;
   generating a fifth vector representation for each of the plurality of texts using the first trained model parameters of the first LSTM unit and a sixth vector representation for each of the plurality of texts using the second trained model parameters of the second LSTM unit;
   combining, by the text classification system, the third vector representation and the fourth vector representation using each of the plurality of combiner operators to obtain corresponding a plurality of combined vector representations;
   providing, by the text classification system, the plurality of combined vector representations to the classifier to obtain classification for each of the plurality of combined vector representations;
   determining, by the text classification system, an accuracy value for each of the classification by comparing each of the classification with a predefined classification stored in a data source associated with the text classification system; and
   selecting, by the text classification system, the combiner operator from the plurality of combiner operators, based on a magnitude of the accuracy value of the classification of the plurality of combined vector representations.

13. A non-transitory computer readable medium including instructions stored thereon that well processed by at least one processor cause a device to perform operations comprising:
   receiving, by a text classification system, a text from a plurality of texts;
   training the text classification system using a plurality of similar pair of texts and a plurality of dissimilar pair of texts from the plurality of texts, to obtain first trained model parameters of a first Long Short Term Memory (LSTM) unit and second trained model parameters of a second LSTM unit;
   generating, by the text classification system, a first vector representation of the text using the first trained model parameters of the first LSTM unit and a second vector representation of the text using the second trained model parameters of the second LSTM unit;
   combining, by the text classification systems, the first vector representation and the second vector representation using a combiner operator to obtain a combined vector representation, wherein the combiner operator is selected from a plurality of combiner operators based on the training using an accuracy value of a classifier of the text classification system, wherein the accuracy value of the classifier is determined by comparing a classification performed by the classifier with a predefined classification stored in a data source; and
   providing, by the text classification system, the combined vector representation to the classifier for determining a classification of the text.

* * * * *